May 8, 1956 F. MEYER 2,745,053
D. C. REFERENCE SOURCE
Filed Nov. 12, 1953 3 Sheets-Sheet 1
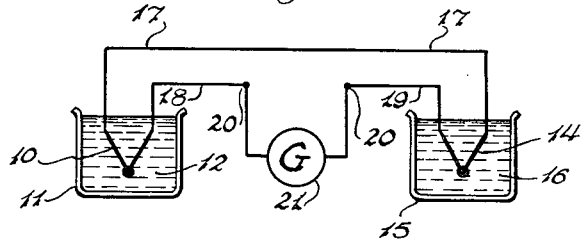
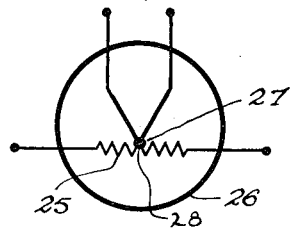
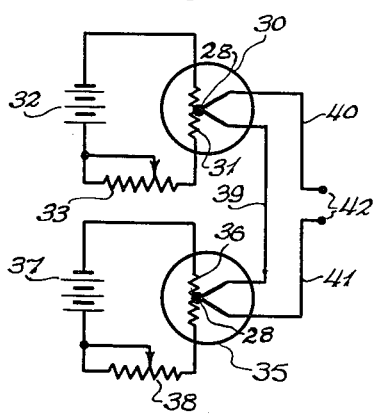
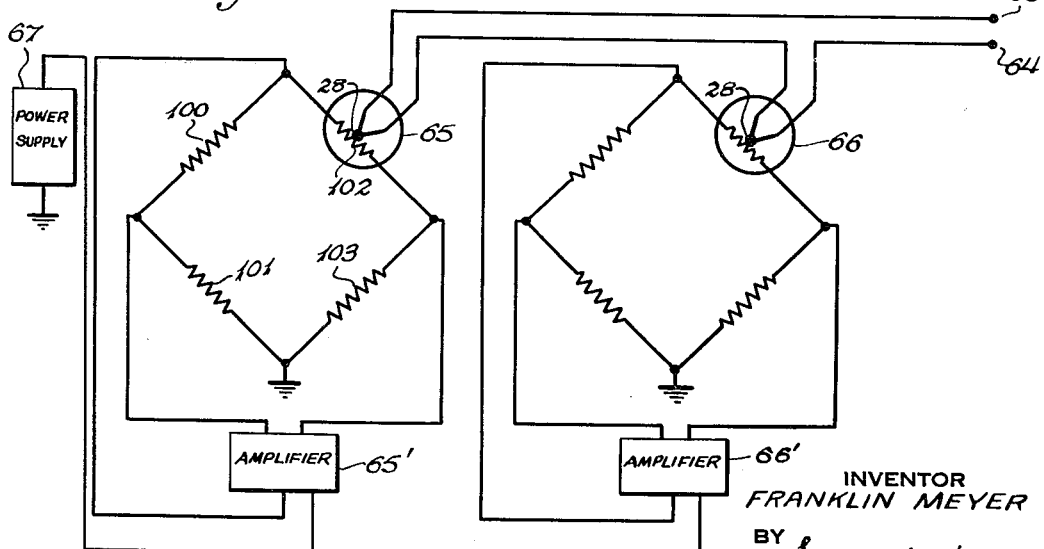
INVENTOR
FRANKLIN MEYER
BY Leonard H. King
AGENT

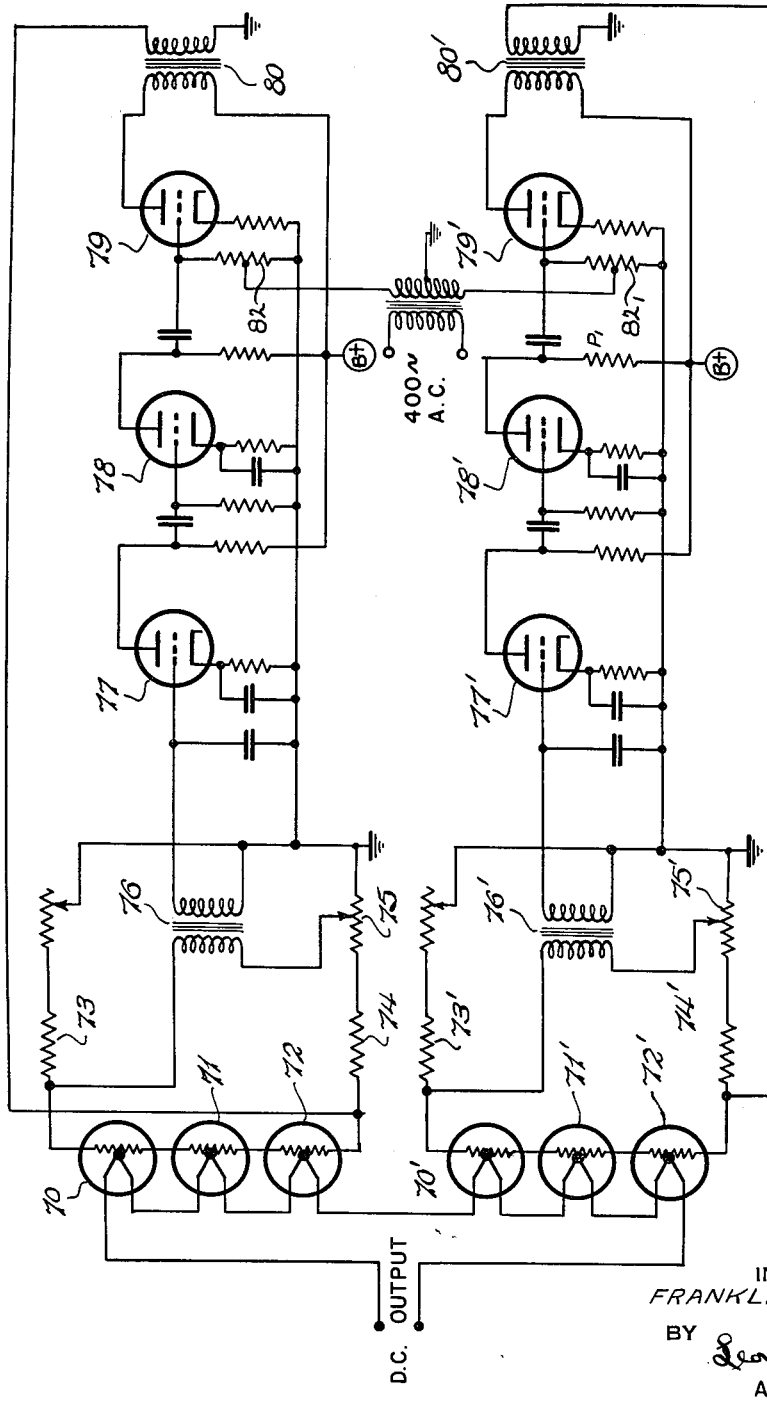

May 8, 1956 F. MEYER 2,745,053
D. C. REFERENCE SOURCE
Filed Nov. 12, 1953 3 Sheets-Sheet 3

INVENTOR.
Franklin Meyer
BY
Leonard H. King
AGENT

United States Patent Office 2,745,053
Patented May 8, 1956

2,745,053

D. C. REFERENCE SOURCE

Franklin Meyer, Franklin Square, N. Y., assignor to Aviation Engineering Division, Avien-Knickerbocker, Inc., Woodside, N. Y.

Application November 12, 1953, Serial No. 391,519

15 Claims. (Cl. 323—69)

This invention relates to direct current reference voltage sources and more particularly to electronically controlled sources utilizing vacuum thermocouples.

Prior direct current reference voltage sources have included chemical cells such as the Standard Cell and electronic devices of the gas tube type. Many disadvantages are inherent in the prior devices. All gas voltage regulator tubes have a definite temperature coefficient caused by change of gas pressures with ambient temperature. They are also subject to long term drifts of voltage output, and changes in conduction modes with changes in current. Finally and most important for very accurate regulation, the gas tubes are not interchangeable. For instance one tube might regulate at 82 volts, and another at 92 volts.

The Standard Cell accuracy is too limited for certain critical applications and a greater accuracy is desired. Also the cell accuracy is destroyed if current is drawn, therefore, it is only useful for momentary connection to a high impedance circuit as for zero setting a measuring instrument.

Conventional systems using direct (D. C.) voltage amplifiers are unstable and are not suitable for very accurate regulation. The system of the present invention avoids the use of chemical cells, gas tubes and direct (D. C.) voltage amplifiers. It utilizes a pair of opposing thermocouples and means to accurately control their temperature and may be used as an active part of a control system.

An object of the present invention is to provide a circuit having a novel arrangement of electronic elements whereby a direct (D. C.) voltage is generated whose magnitude remains very constant despite wide variations in the power voltages supplied to said circuit.

Another object of the present invention is to provide a very accurate reference voltage source whose direct (D. C.) voltage output remains constant despite large changes in the ambient temperature.

Another object of the present invention is to provide a source of direct (D. C.) voltage whose magnitude remains constant despite rapid changes in the ambient temperature.

An additional object of the present invention is to provide an electronic reference voltage source whose output remains constant regardless of transient variations inherent in the power supplied to said source.

A still further object of the present invention is to provide a reference voltage source having minimum warm-up time.

A particular object is to provide an improved thermocouple device.

A further object of the present invention is to provide an electronic reference voltage source having a low source impedance.

An additional object of the present invention is to provide an electronic direct (D. C.) reference voltage source which is simple in design, has no moving parts and which is free from variations in vacuum tube characteristics.

To the accomplishment of the foregoing and such other objects as may hereinafter appear, the invention comprises the novel construction and arrangement of parts hereinafter to be described and then sought to be defined in the appended claims, reference being had to the accompanying drawings forming a part hereof, which show merely for the purposes of illustrative disclosure, preferred embodiments of the invention, it being expressly understood, however, that changes may be made in practice within the scope of the claims without digressing from the inventive idea.

In general, the D. C. reference voltage source of this invention consists of a pair of thermocouples, one serving as a hot junction and the other serving as a cold junction compensating unit. Connected in series opposition, the output of the two thermocouples serves as a D. C. reference source. The accuracy necessary to make it a practical reference source is derived from a novel method of maintaining the temperatures of the respective hot and cold junction thermocouples constant. In brief, the thermocouples are heated by a reistance wire element which forms one leg of a Wheatstone bridge type circuit. Each thermocouple is maintained at a different constant temperature by providing two such bridges and having each heater wire maintained at a different constant temperature. The wire is formed of metal having a high temperature coefficient of resistance. Since the heater wire changes resistance with temperature, there will be one, and only one, temperature and therefore one, and only one, resistance at which each Wheatstone bridge will be in balance. This balance can be obtained by varying the voltage across the bridge which therefore changes the power input through the heater wire until the temperature of the wire is such that its resistance is of the proper value to make the bridge be exactly at balance. This is done automatically and continuously with a very fast time response, by providing an all-electronic closed servo loop as described later in greater detail. The two heater wires being thus maintained at constant temperature result in a constant D. C. output being provided by the thermocouples.

In the drawings in which similar reference characteristics denote corresponding parts:

Figures 1, 2, and 3 are schematic diagrams illustrative of the invention, and

Figures 4 and 5 are schematic diagrams of embodiments of the invention.

Figure 6 shows schematically the preferred embodiment of this invention.

Figure 7:
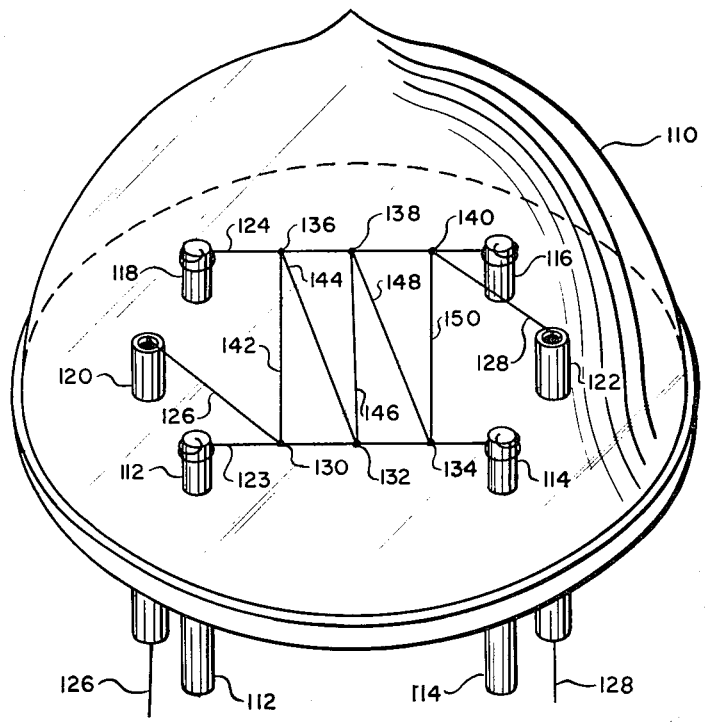

Figure 7 presents in perspective a preferred thermocouple of this invention.

Referring now to Figure 1, there is shown thermocouple 10 supported in container 11 filled with liquid 12. Thermocouple 14 is supported in container 15 filled with liquid 16. Thermocouple 10 is formed of Chromel lead 17 and constantan lead 18 while thermocouple 14 is formed of Chromel lead 17 and constantan lead 19 thus terminals 20 are both constantan. Therefore, if between terminals 20 there is interposed a circuit such as the copper winding of a galvanometer 21, the potential developed by the constantan-copper thermocouple at lead 18 will cancel out the constantan-copper thermocouple formed by lead 19. Thus it may be seen that if the galvanometer were connected directly to thermocouple 10, the junction between lead 18 and the galvanometer and the junction between lead 17 and the galvanometer being of dissimilar metals would result in different potentials being generated at each junction. Therefore, an error would result. The connection of an additional thermocouple in series opposition provides what is known as cold junction compensation and eliminates this error since both terminals 20 are of the same material.

If the liquids 12 and 16 are maintained at the same temperature the voltage generated by thermocouple 10 will exactly equal the voltage generated by thermocouple 14. Since two thermocouples have their similar branches connected, these two voltages will oppose each other, with the resultant voltage, as measured across terminals 20 by galvanometer 21, being zero.

However, if a temperature difference exists between the two liquids 12 and 16, the voltages generated by the two thermocouples will be different, with the electrical resultant appearing between the terminals 20. The magnitude of the resultant voltage will, of course, be dependent on the magnitude of the temperature difference between the two thermocouples.

The polarity depends, of course, upon the materials used in the thermocouples as well as which of the two thermocouples is operated at the higher temperature. For a given pair of materials the polarity of the output voltage may be changed by reversing the positions of the two thermocouples.

The voltage appearing between terminals 20 are dependent on the temperature difference of the two junctions, as well as the specific temperature of the junctions since, in general, thermocouples do not exhibit a linear variation in voltage output with variation in temperature. It may be appreciated that by maintaining the temperatures of the two thermocouples constant, a constant direct current voltage is created.

In practice, however, it is not practical to maintain two liquid baths at constant temperatures. To overcome this difficulty a pair of vacuum thermocouples is utilized in accordance with the present invention. A vacuum thermocouple, shown schematically in Figure 2, utilizes a fine wire or resistance element 25 which is maintained in an evacuated chamber or container 26. A thermocouple 27 is in thermal contact with the resistance element 25 but electrically insulated therefrom by insulator 28.

In operation, current is passed through the resistance element 25. The joule heating of the element as the current flows through it raises the temperature of the junction. This temperature increase causes a voltage to appear across the terminals of the thermocouple.

Figure 3 illustrates schematically how two such units may be connected to create a direct (D. C.) reference voltage. Vacuum thermocouple 30 has its resistance wire 31 connected to battery 32, variable resistor 33 being connected in series therewith to control the current which passes through wire 31.

A second vacuum thermocouple 35 has its resistance wire 36 connected to battery 37, variable resistor 38 being connected in series to control the current which passes through wire 36. Lead 39 connects similar branches of vacuum thermocouples 30 and 35. Leads 40 and 41 connect the remaining branches of the two thermocouples to terminals 42.

In operation, variable resistor 33 is adjusted to permit a predetermined current to pass through resistance wire 31. This determines the temperature of the junction of vacuum thermocouple 30. In like manner variable resistor 38 is adjusted to permit a predetermined current to pass through resistance wire 36. This determines the temperature of the junction of vacuum thermocouple 35. By adjusting the two resistors 33 and 38 so that the junction temperatures of the two thermocouples are different, a direct (D. C.) voltage will appear between the two terminals 42. As connected, this voltage is the difference between the voltages generated or created by each of the two thermocouples 30 and 35. The greater the temperature difference between the two resistance wires or elements 31 and 36, the greater will be the resultant output voltage.

While the circuit shown in Figure 3 will produce a direct (D. C.) voltage, its stability is limited. Variation in battery potential and temperature changes of the series resistors would cause the current passing through the resistance wire to vary. This in turn would create a variation in the output of each thermocouple.

Figure 4 illustrates schematically how these objections may be overcome. A bridge 45 is provided, having resistance arms 46, 47 and 48. The fourth arm of bridge 45 is formed by the resistance wire or element 49 of vacuum thermocouple 50. The error voltage, Ve, of the bridge is fed into an amplifier 44 whose output is connected to the input of the bridge together with an A. C. signal applied to power input terminals 51. Thus, a regulator system is obtained. Any error voltage resulting from a change in the temperature of resistance element 49 is applied to the servo amplifier which in turn supplies more or less power to the heater wire 49. This, in turn, raises or lowers the temperature of the heater wire to drive the error voltage to null.

It should be noted that the servo amplifier supplies only a corrective power to the bridge. When the bridge is off balance the amplifier output is either in phase or 180° out of phase with the main supply voltage. If it is in phase, the power input to the bridge will be increased, while if it is 180° out of phase, the power input to the bridge will be decreased.

A second thermocouple 60 is provided as shown in Figure 4. This thermocouple is immersed in a constant temperature liquid batch 61. Similar leads of thermocouple 50 and 60 are connected by lead 62 which is preferable of the same material. The other leads are connected to output posts 63 and 64.

By adjusting the bridge 45 so that the temperature of resistance element 49 is different from the fixed temperature of liquid bath 61, a direct (D. C.) voltage will be provided between terminals 63 and 64. The stability of this voltage will depend upon the control of the temperature of liquid bath 61.

It is possible to completely eliminate the need for a liquid bath by utilizing two separate bridge circuits to control the temperature of a pair of vacuum thermocouples. Figure 5 illustrates such a circuit.

Figure 5 is an arrangement of a pair of thermocouples 65 and 66 each connected in its own bridge circuit. Each thermocouple is stabilized by its amplifier 65' and 66', each of which corrects the individual supply voltage from voltage supply 67 as described in connection with Figure 4. The difference voltage output appears between the output terminals 63 and 64.

Figure 6 shows an arrangement of a pair of thermocouple sources each connected in a bridge circuit as shown in Figure 5, wherein each thermocouple source comprises three thermocouples in series. This embodiment supplies a larger voltage output which may be more easily handled and stabilized. Other equivalent arrangements using more or less than three thermocouples may be used.

Figure 6 generally comprises two bridge circuits as in Figure 5. Thermocouples 70, 71 and 72 are in one arm, and resistors 73, 74 and 75 comprise the other arms of the first bridge. The unbalance voltage is taken across the primary of transformer 76 and amplified in several stages 77, 78 and 79 of amplification. The amplified output is taken across transformer 80 and connected to correct the output of A. C. voltage source which is fed by means of transformer 81 to the grid of amplifier stage 79 by using a divided grid leak resistance 82. This method of injecting the A. C. power into the system is preferred.

The other bridge circuit comprises thermocouples 70', 71' and 72' and resistors 73', 74' and 75', transformer 76', amplifier stages 77', 78' and 79', and transformer 80'. It operates in exactly the same manner as previously described.

In Figure 7 there is shown a preferred thermocouple element of this invention. A glass envelope 110 is used to provide a hermetically sealed vacuum chamber. The envelope is provided with electrically conductive pins 112, 114, 116 and 118 extending from the inside of the envelope to the outside and are sealed into the envelope in such a manner that the hermetic seal is maintained. Tubes 120 and 122 extend through the envelope in the same manner. The metal used for pins 112, 114, 116 and 118 and tubes 120 and 122 should have the same temperature coefficient of expansion as the glass to insure maintenance of the seal despite temperature variations. Many combinations of glass and metal which may be used to provide such a seal are well known to industry. Between pins 112 and 114 there is secured by welding a tungsten alloy filament wire and similarly another filament is secured between pins 116 and 118. By connecting pins 112 and 114 into the Wheatstone bridge circuit as shown in Figure 6, the filament may be heated. In order to eliminate secondary thermocouple junctions, the thermocouple wire 126 is fed through tube 120; the opening between the thermocouple wire and the tube being sealed by means of solder. Assuming a Chromel-constantan thermocouple, wire 126 may be Chromel, correspondingly Chromel wire 128 is fed through tube 122 and soldered therein. Beads 130, 132, 134, 136, 138 and 140 are supported by filaments 123 and 124 and serve to electrically insulate the thermocouple junctions from the filaments while providing good thermal conductivity between the junctions and the filaments. There is shown joining Chromel wire 126 at insulator bead 130 constantan wire 142. At bead 136 constantan wire 142 is joined in a thermocouple junction by Chromel wire 144. In turn at bead 132 constantan wire 146 joins Chromel wire 144 and at bead 138 Chromel wire 148 is joined to constantan wire 146. At bead 134 Chromel wire 148 is joined to a constantan wire 150 which in turn is connected at bead 140 to Chromel wire 128. Filament 124 can thus serve as the low temperature thermocouple junction heater and filament 123 may serve as the high temperature thermocouple. This junction heater arrangement is preferred over the use of individual thermocouples as is shown in Figure 6, since all secondary thermocouple junctions are eliminated. It is to be noted that the series thermocouple string alternates a high temperature junction wtih a cold temperature junction.

Having thus described my invention what I desire to claim as new is:

1. A direct voltage source comprising a pair of thermocouples connected in opposing relation in series with a pair of output terminals, means for electrically heating each of said thermocouples to a different temperature, means for automatically maintaining said temperature constant.

2. A reference voltage source comprising a pair of thermocouples connected in opposition in series with a pair of output terminals, a resistance wire having a current passing therethrough, in thermal contact with each of said thermocouples but electrically insulated therefrom, means to maintain constant said current through each of said resistance wires.

3. A reference voltage source comprising a pair of thermocouples connected in opposition in series with a pair of output terminals, a resistance wire carrying an electric current, in thermal contact with each of said thermocouples but electrically insulated therefrom, means to maintain constant said current through each of said resistance wires, each of said resistance wires serving as one arm of a separate Wheatstone bridge and means to maintain said bridge in balanced condition.

4. A reference voltage source comprising a pair of output terminals and a pair of thermocouples of the type heated by a resistance wire, said thermocouples being in opposed relation and in series with said pair of output terminals, a pair of balanced bridge circuits having input and output terminals and including one of said resistance wires, a pair of servo amplifiers having their inputs connected to the said bridge output terminals of each of said bridges, the outputs of said amplifiers being connected to said bridge input terminals, and means for introducing an A. C. voltage into said amplifiers.

5. Apparatus as in claim 4 wherein additional thermocouples are connected in series with each of said thermocouples so as to provide a larger output reference voltage.

6. A reference voltage source having an output insensitive to change in ambient temperature comprising a pair of balanced bridge circuits having a pair of input and a pair of output terminals, a first thermocouple heated by a resistance wire serving as one arm of one of said bridge circuits, a second thermocouple heated to a different temperature by a resistance wire serving as one arm of the second of said bridge circuits, an A. C. energizing source connected to said input terminals of said bridge circuits, a pair of amplifiers each connected across said output terminals of said bridge circuits, across the output terminals of one of said bridge circuits, the outputs of said amplifiers being connected to said input terminals of each of said bridge circuits.

7. A stable voltage source comprising a pair of thermocouple means in opposing relation and an electrically energized heat source arranged to heat each of said thermocouples to a different temperature and separate servo amplifier means connected to regulate each of said heat sources.

8. Apparatus as in claim 7 wherein each of said heat sources is a resistance connected in a balanced bridge circuit and wherein said amplifier means regulate said heat sources by maintaining said bridges in balance.

9. A reference voltage source comprising a pair of thermocouples, a separate resistance heat source for heating each thermocouple to a different temperature and means connected to regulate each heat source comprising means to automatically control the current through each of said resistances.

10. A reference voltage source comprising a pair of thermocouples maintained at different temperatures and having bucking output connections, and servo amplifier means connected to maintain said different temperatures.

11. A D. C. reference source comprising, a thermocouple electrically heated to a first temperature by means of a resistance wire, a second thermocouple connected in series opposition to said first thermocouple, said second thermocouple being heated to a second temperature by a second resistance element, output terminals in series with said thermocouples, a first circuit containing said first resistance element comprising a bridge having input and output terminals, an amplifier having at least two stages of amplification having its input terminals connected to said output terminals of said bridge and its output terminals connected to said bridge input terminals, a second circuit containing said second resistance element comprising a bridge having input and output terminals, an amplifier having its input terminals connected to said bridge input terminals, and means to introduce an A. C. signal at the grid of one of said vacuum tubes in each of said amplifiers.

12. The apparatus of claim 11 wherein a plurality of thermocouples in series connection is heated by each of said resistance wires.

13. The apparatus of claim 11 wherein each of said resistance wires energizes a plurality of thermocouples, said thermocouples being connected in series so that a thermocouple heated by said first wire is directly connected to a thermocouple heated by said second wire.

14. A thermocouple device comprising a first and a second filament wire, a plurality of thermocouple junctions in series connection arranged so that alternate junctions of said plurality of junctions are heated by said first wire and the remainder of said plurality of junctions are heated by said second wire, a hermetically sealed envelope enclosing said filament and said junctions, electrically conductive means for energizing said filaments and leads formed of the said material as said thermocouple, in series connection with said thermocouple junctions and extending through said envelope.

15. A device of claim 14 wherein said leads are sealed into metal tubes which extend through said envelope.

References Cited in the file of this patent

UNITED STATES PATENTS

| | | |
|---|---|---|
| 2,443,641 | Ray | June 22, 1948 |
| 2,510,397 | Hansell | June 6, 1950 |
| 2,577,111 | Dowling et al. | Dec. 4, 1951 |